United States Patent
Chen et al.

(10) Patent No.: US 10,911,188 B2
(45) Date of Patent: Feb. 2, 2021

(54) HARQ FEEDBACK MODE DETERMINATION FOR DOWNLINK TRANSMISSION

(71) Applicant: Telefonaktiebolaget LM Ericsson (publ), Stockholm (SE)

(72) Inventors: Xixian Chen, Ottawa (CA); Akram Bin Sediq, Kanata (CA); Mercy George, Kanata (CA); Patrick Lie Chin Cheong, Kanata (CA); Jianguo Long, Kanata (CA); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 16/340,741

(22) PCT Filed: Feb. 15, 2017

(86) PCT No.: PCT/IB2017/050846
§ 371 (c)(1),
(2) Date: Apr. 10, 2019

(87) PCT Pub. No.: WO2018/138555
PCT Pub. Date: Aug. 2, 2018

(65) Prior Publication Data
US 2019/0319751 A1  Oct. 17, 2019

Related U.S. Application Data

(60) Provisional application No. 62/450,332, filed on Jan. 25, 2017.

(51) Int. Cl.
*H04L 1/18* (2006.01)
*H04W 84/04* (2009.01)

(52) U.S. Cl.
CPC .......... *H04L 1/1825* (2013.01); *H04L 1/1812* (2013.01); *H04W 84/042* (2013.01)

(58) Field of Classification Search
CPC ... H04L 1/1825; H04L 1/1812; H04L 5/0053; H04L 61/2592; H04W 84/042
See application file for complete search history.

(56) References Cited

U.S. PATENT DOCUMENTS

| | | | |
|---|---|---|---|
| 2014/0269459 A1* | 9/2014 | Fan | H04L 61/2592 370/294 |
| 2015/0124728 A1* | 5/2015 | Bergstrom | H04L 5/0053 370/329 |
| 2016/0204924 A1* | 7/2016 | Li | H04L 5/0053 370/280 |

FOREIGN PATENT DOCUMENTS

WO   WO 2015/106456 A1   7/2015

OTHER PUBLICATIONS

International Search Report and Written Opinion of the International Searching Authority for International Application No. PCT/IB2017/050846 dated Oct. 2, 2017.

(Continued)

*Primary Examiner* — Vinncelas Louis
(74) *Attorney, Agent, or Firm* — Sage Patent Group

(57) ABSTRACT

Systems and methods related to optimized selection, or determination of, Hybrid Automatic Repeat Request (HARQ) feedback modes for downlink transmissions by considering Time Division Duplexing (TDD) uplink/downlink (UL/DL) configuration, transmission mode, cell load, and/or traffic type are disclosed. In this manner, performance can be improved.

20 Claims, 9 Drawing Sheets

---

SELECT HARQ FEEDBACK MODE FOR A WIRELESS DEVICE(S) IN ACCORDANCE WITH ONE OR MORE PREDEFINED RULES BASED ON ONE OR MORE CRITERIA INCLUDING TDD UL/DL CONFIGURATION, TRANSMISSION MODE, TRAFFIC PATTERN (E.G., ACTUAL OR ANTICIPATED TRAFFIC PATTERN), AND/OR CELL LOAD (E.G., AVG. NUMBER OF ACTIVE USERS AND/OR PROBABILITY OF PUCCH FORMAT 3 COLLISIONS)
100

CONFIGURE THE WIRELESS DEVICE(S) WITH THE SELECTED HARQ FEEDBACK MODE
102

(56) References Cited

OTHER PUBLICATIONS

3GPP TS 36.213 V11.12.0, "3rd Generation Partnership Project; Technical Specification Group Radio Access Network; Evolved Universal Terrestrial Radio Access (E-UTRA); Physical layer procedures (Release 11)," 184 pages, Sep. 2016.

* cited by examiner

HARQ ACK/NACK timing for configuration 1
*(PRIOR ART)*

Bundled HARQ feedback transmission per codeword in TDD configuration 2
*(PRIOR ART)*

FIG. 3
*Bundled codeword HARQ feedback (HARQ-ACK multiplexing) transmission in TDD configuration 2*

FIG. 4
*HARQ feedback transmission using PUCCH format 3 in TDD configuration 2*

HARQ FEEDBACK MODE DETERMINATION FOR DOWNLINK TRANSMISSION

RELATED APPLICATIONS

This application is a 35 U.S.C. § 371 national stage application of PCT International Application No. PCT/IB2017/050846, filed on Feb. 15, 2017, which claims the benefit of U.S. provisional patent application Ser. No. 62/450,332, filed Jan. 25, 2017, the disclosure of which is hereby incorporated herein by reference in its entirety.

TECHNICAL FIELD

The present disclosure relates to Hybrid Automatic Repeat Request (HARQ) in a Time Division Duplexing (TDD) cellular communications network and, in particular, relates to selection of a HARQ feedback mode in a TDD cellular communications network.

BACKGROUND

Hybrid Automatic Repeat Request (HARQ) is an important component of Long Term Evolution (LTE) and Fifth Generation (5G). In Time Division Duplexing (TDD) LTE, the HARQ process is different from that in Frequency Division Duplexing (FDD) LTE. In the case of FDD, for a transmission on subframe #n, HARQ feedback (i.e., a HARQ Acknowledgement/Negative Acknowledgement (ACK/NACK)) is sent on subframe #n+4. The reason for the four subframe delay in the transmission of a HARQ ACK/NACK message is due to the processing delay of about 3 milliseconds (ms) at the receiver. If the HARQ feedback is a NACK, a retransmission is scheduled on subframe #n+8 for uplink transmissions while the retransmission for downlink can be asynchronous.

In TDD LTE, the time association between the data transmission and the HARQ ACK/NACK cannot be maintained due to the variable number of downlink and uplink subframes being present in a frame. The uplink and downlink delay between the data transmission and the corresponding HARQ ACK/NACK is dependent on the TDD uplink/downlink (UL/DL) configuration chosen. Hence, a fixed delay between a data transmission and the HARQ ACK/NACK is not possible in TDD.

In TDD, the delay between the transmission and the HARQ ACK/NACK depends on both the TDD UL/DL configuration and the subframe in which the data was transmitted. A fixed delay cannot be assured as subframes are allocated to downlink and uplink depending on the TDD UL/DL configuration. For example, in TDD UL/DL configuration 1 which is shown in FIG. 1, there are some downlink subframes for which the nearest uplink subframe separated from the downlink subframe by four or more subframes is seven subframes away. In FIG. 1, this can be seen clearly for the downlink data transmission case.

In TDD, the number of downlink and uplink subframes in a frame is not equal. For instance, TDD UL/DL configurations 1-5 have more downlink subframes than uplink subframes. Consequently, data transmission from multiple downlink subframes needs to be acknowledged in a certain uplink subframe and vice-versa for certain cases for the uplink data transmission. The transmission of multiple HARQ ACK/NACK messages in uplink or downlink subframes is a unique feature of TDD LTE as compared with FDD LTE due to the above mentioned scenario. For example, in TDD UL/DL configuration 1, HARQ feedback for downlink data transmissions in subframe #0 and subframe #1 is transmitted in subframe #7 to avoid further delays. In each TDD UL/DL configuration, the ACK/NACK response window is clearly specified keeping in mind both the delay as well as balance in the number of HARQ ACK/NACKs to be sent in a subframe. Multiple HARQ feedback modes have been specified in, e.g., the Third Generation Partnership Project (3GPP) Technical Specification (TS) 36.213 V13.4.0 (see, e.g., section 10.1.3) to deal with this issue. These HARQ feedback modes include HARQ-ACK bundling, HARQ-ACK multiplexing, and a Physical Uplink Control Channel (PUCCH) Format 3 HARQ feedback mode (i.e., a HARQ feedback mode that uses PUCCH Format 3).

The TDD HARQ-ACK bundling feedback mode is a HARQ ACK feedback mode in which HARQ feedback is performed per codeword across multiple downlink subframes associated with a single uplink subframe n by a logical AND operation of all the individual Physical Downlink Shared Channel (PDSCH) transmission HARQ ACK/NACKs. If all the transport blocks associated with an uplink subframe are successfully decoded for a codeword, the bundled HARQ feedback for the codeword is an ACK. If decoding of at least one transport block failed, the bundled HARQ feedback is a NACK. For example, in TDD UL/DL configuration 2 which is shown in FIG. 2, the bundled HARQ feedback per codeword for downlink subframes #4, #5, #6, and #8 are transmitted on uplink subframe #2 of the next radio frame. The performance will degrade when the bundled subframes have different channel conditions (de-correlated over time).

In the HARQ-ACK multiplexing feedback mode, if the number of downlink subframes associated with a single uplink subframe n is greater than 1, spatial HARQ-ACK bundling across the codewords within a downlink subframe is performed by a logical AND operation of all the corresponding individual HARQ-ACK/NACKs, as shown in FIG. 3. If both transport blocks of two codewords transmitted on the same subframe are successfully decoded, the spatially bundled HARQ feedback is an ACK. If decoding of at least one transport block failed, the spatially bundled HARQ feedback is a NACK. This HARQ feedback mode is fine for Transmission Mode (TM) 3 (TM3), since the large Cyclic Delay Diversity (CDD) enables two Multiple Input Multiple Output (MIMO) codewords to experience almost the same channel conditions. However, there will be some performance degradation if it is applied to other transmission modes, such as TM4, TM8, TM9, and TM10, since two codewords may have different channel conditions (uncorrelated in spatial domain). Note that if the number of downlink subframes associated with a single uplink subframe n is equal to 1, spatial HARQ-ACK bundling across multiple codewords within a downlink subframe is not performed, one or two HARQ-ACK bits are transmitted using PUCCH Format 1a or PUCCH Format 1b, respectively for one configured serving cell.

In the PUCCH Format 3 HARQ feedback mode, when multiple downlink subframes are associated with a single uplink subframe n, each individual ACK/NACK information for each codeword and each subframe (e.g., one ACK/NACK bit per codeword per subframe) is sent to the network (e.g., to the enhanced or evolved Node B (eNB)) by the User Equipment device (UE) in an associated subframe. This HARQ feedback mode gives the best performance if the number of users in a cell is small. Since it requires a lot of PUCCH resources, it cannot be used for a cell with a large number of users.

SUMMARY

Systems and methods related to optimized selection, or determination of, Hybrid Automatic Repeat Request (HARQ) feedback modes for downlink transmissions by considering Time Division Duplexing (TDD) uplink/downlink (UL/DL) configuration, transmission mode, cell load, and/or traffic type are disclosed. In this manner, performance can be improved.

In some embodiments, a method of operation of a network node in a cellular communications network comprises selecting a HARQ feedback mode for at least one wireless communication device served by a cell in accordance with one or more predefined rules based on one or more criteria comprising a TDD UL/DL configuration for the cell, a downlink transmission mode for the at least one wireless communication device for the cell, a traffic pattern for the at least one wireless communication device for the cell, and/or a cell load of the cell and configuring the at least one wireless communication device with the HARQ feedback mode. In other words, the method comprises selecting the HARQ feedback mode for the at least one wireless communication device served by the cell in accordance with any one of the aforementioned criteria or any combination of two or more of the aforementioned criteria. Indeed, in some embodiments, the network node has the capability to consider any and all of the aforementioned criteria but may consider any one or more of the criteria. In other embodiments, the network node has the capability to consider only some of the aforementioned criteria (e.g., may only have the capability to consider the one or more of the criteria on which the selection of the HARQ feedback mode is based).

In some embodiments, the one or more predefined rules comprise at least one rule based on the TDD UL/DL configuration for the cell. In some embodiments, the one or more predefined rules comprise at least one rule based on the downlink transmission mode for the at least one wireless communication device for the cell. In some embodiments, the one or more predefined rules comprise at least one rule based on the traffic pattern for the at least one wireless communication device for the cell. In some embodiments, the one or more predefined rules comprise at least one rule based on the cell load of the cell. In some embodiments, the one or more predefined rules comprise at least one rule based on the wireless device preferred HARQ feedback mode. In some embodiments, the one or more predefined rules are prioritized.

In some embodiments, selecting the HARQ feedback mode comprises selecting the HARQ feedback mode from a plurality of predefined HARQ feedback modes comprising a HARQ Acknowledgement (ACK) bundling feedback mode, a HARQ-ACK multiplexing feedback mode, and a feedback mode that provides individual HARQ feedback for each codeword and for each subframe. Further, in some embodiments, the feedback mode that provides individual HARQ feedback for each codeword and for each subframe is a HARQ feedback mode that uses Physical Uplink Control Channel (PUCCH) Format 3.

In some embodiments, the one or more predefined rules comprise a rule that states that the feedback mode that provides individual HARQ feedback for each codeword and for each subframe is to be selected if an associated collision rate is less than a predefined threshold.

In some embodiments, the one or more predefined rules comprise a rule that states that either the HARQ-ACK bundling feedback mode or the HARQ-ACK multiplexing feedback mode is to be selected if the cell load is greater than a predefined threshold.

In some embodiments, the one or more predefined rules comprise a rule that states that, if the at least one wireless communication device is configured in one of a set of transmission modes that have two different Channel Quality Indication (CQI) reports for two codewords, the HARQ-ACK bundling feedback mode is to be selected.

In some embodiments, the one or more predefined rules comprise a rule that states that, if the at least one wireless communication device is configured in a transmission mode in which the at least one wireless communication device is to receive only one codeword, the HARQ-ACK multiplexing feedback mode is to be selected.

In some embodiments, the one or more predefined rules comprise a rule that states that, if the at least one wireless communication device is configured in a transmission mode that has only one CQI report and in which the at least one wireless communication device is to receive two codewords, the HARQ feedback mode is to be based on one or more rules for selecting between the HARQ-ACK bundling feedback mode and the HARQ-ACK multiplexing feedback mode. In some embodiments, the one or more rules for selecting between the HARQ-ACK bundling feedback mode and the HARQ-ACK multiplexing feedback mode comprise at least one of the following rules: a rule that states that the HARQ-ACK bundling feedback mode is to be selected if the TDD UL/DL configuration is one having a maximum HARQ-ACK window size that is less than a configurable parameter, n; a rule that states that, if the traffic pattern for the at least one wireless communication device does not require bundled downlink transmissions, then HARQ-ACK bundling is to be selected; a rule that states that the HARQ-ACK bundling feedback mode is to be selected if a percentage of all downlink transmissions to the at least one wireless communication device in the cell that are bundled downlink transmissions is less than a predefined threshold; a rule that states that the HARQ-ACK multiplexing feedback mode is to be selected if the percentage of all downlink transmissions to the at least one wireless communication device in the cell that are bundled downlink transmissions is greater than a predefined threshold; and a rule that states that, if the TDD UL/DL configuration is one having a maximum HARQ-ACK window size that is greater than a configurable parameter, n, the HARQ-ACK bundling feedback mode is to be selected if an average number of downlink active users is greater than a predefined threshold and, otherwise, the HARQ-ACK multiplexing feedback mode is to be selected.

In some embodiments, the one or more predefined rules comprise a rule that states that, if the at least one wireless communication device is configured in a transmission mode that has two different CQI reports for two codewords, the HARQ-ACK bundling feedback mode is to be selected if an average number of downlink active users is greater than or equal to a predefined threshold number of active users and, otherwise, the HARQ-ACK multiplexing feedback mode is to be selected.

In some embodiments, the feedback mode that provides individual HARQ feedback for each codeword and for each subframe is a HARQ feedback mode that uses PUCCH Format 3, and the one or more predefined rules comprise a rule that states that, if the at least one wireless communication device is at least one TDD non-Carrier Aggregation (CA) wireless communication device, the feedback mode that provides individual HARQ feedback for each codeword and for each subframe is to be selected if a probability of PUCCH Format 3 collision is less than a predefined collision threshold and, otherwise, either the HARQ-ACK bundling feedback mode or the HARQ-ACK multiplexing feedback mode is to be selected.

In some embodiments, selecting the HARQ feedback mode comprises selecting a first HARQ feedback mode for the at least one wireless communication device, and configuring the at least one wireless communication device comprises configuring the at least one wireless communication device with the first HARQ feedback mode. In some embodiments, the method further comprises determining that there is to be a change in HARQ feedback mode for the at least one wireless communication device and, upon determining that there is to be a change in HARQ feedback mode for the at least one wireless communication device: selecting a second HARQ feedback mode for the at least one wireless communication device in accordance with the one or more predefined rules based on the one or more criteria comprising the TDD UL/DL configuration for the cell, the downlink transmission mode for the at least one wireless communication device in the cell, the traffic pattern for the at least one wireless communication device in the cell, and/or the cell load of the cell; and configuring the at least one wireless communication device with the second HARQ feedback mode.

In some embodiments, determining that there is to be a change in HARQ feedback mode for the at least one wireless communication device comprises determining that there is to be a change in HARQ feedback mode for the at least one wireless communication device based on at least one criterion comprising a change in the downlink transmission mode for the at least one wireless communication device in the cell, a change in the traffic pattern for the at least one wireless communication device in the cell, and a change in the cell load of the cell.

Embodiments of a network node for a cellular communications network are also disclosed. In some embodiments, a network node for a cellular communications network is adapted to perform the method of operation of a network node according to any one of the embodiments disclosed herein.

In some embodiments, a network node for a cellular communications network comprises at least one processor and memory storing instructions executable by the at least one processor whereby the network node is operable to perform the method of operation of a network node according to any one of the embodiments disclosed herein. In some particular embodiments, by execution of the software by the at least one processor the network node is operable to select a HARQ feedback mode for at least one wireless communication device served by a cell in accordance with one or more predefined rules based on one or more criteria comprising a TDD UL/DL configuration for the cell, a downlink transmission mode for the at least one wireless communication device for the cell, a traffic pattern for the at least one wireless communication device for the cell, and/or a cell load of the cell and configure the at least one wireless communication device with the HARQ feedback mode.

In some embodiments, a network node for a cellular communications network comprises a selecting module and a configuring module. The selecting module is operable to select a HARQ feedback mode for at least one wireless communication device served by a cell in accordance with one or more predefined rules based on one or more criteria comprising a TDD UL/DL configuration for the cell, a downlink transmission mode for the at least one wireless communication device for the cell, a traffic pattern for the at least one wireless communication device for the cell, and/or a cell load of the cell. The configuring module is operable to configure the at least one wireless communication device with the HARQ feedback mode.

Embodiments of a computer program are also disclosed. In some embodiments, a computer program comprises instructions which, when executed on at least one processor, cause the at least one processor to carry out the method of operation of a network node according to any one of the embodiments disclosed herein. In some embodiments, a carrier containing the aforementioned computer program is provided, wherein the carrier is one of an electronic signal, an optical signal, a radio signal, or a computer readable storage medium.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates bundled codeword HARQ feedback (HARQ-ACK multiplexing) transmission in TDD UL/DL configuration 2;

FIG. 4 illustrates HARQ feedback transmission using Physical Uplink Control Channel (PUCCH) Format 3 in TDD UL/DL configuration 2;

DETAILED DESCRIPTION

Figure 1:
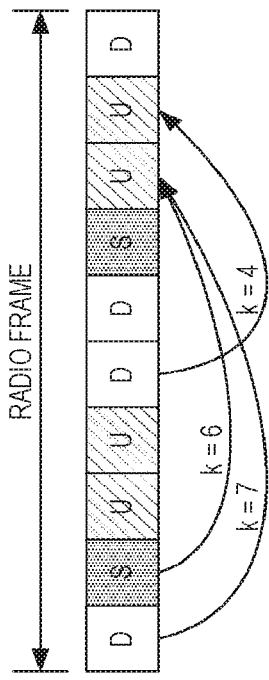
FIG. 1 illustrates Hybrid Automatic Repeat Request (HARQ) Acknowledgement/Negative Acknowledgement (ACK/NACK) timing for Time Division Duplexing (TDD) uplink/downlink (UL/DL) configuration 1.
Figure 2:
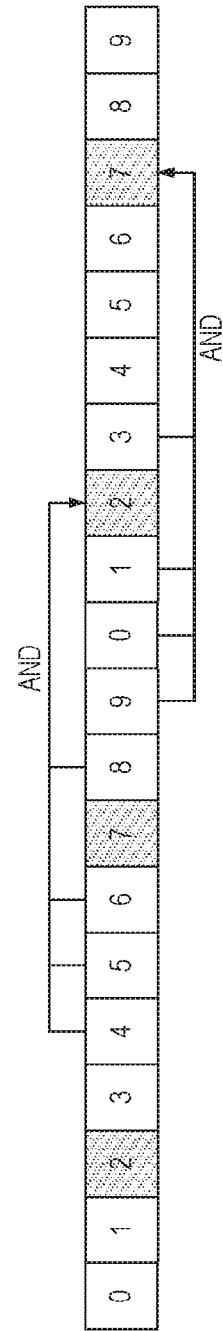
FIG. 2 illustrates bundled HARQ feedback transmission per codeword for TDD UL/DL configuration 2.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device:

As used herein, a "wireless device" or "wireless communication device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node:

As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In conventional implementations of 3GPP LTE, the Hybrid Automatic Repeat Request (HARQ) feedback mode is statically configured and does not achieve the best performance. As such, there is a need for systems and methods for selecting and configuring the HARQ feedback mode in such a manner that performance is improved.

More specifically, in conventional implementations of 3GPP LTE, the configuration of the HARQ feedback mode is statically configured without considering Time Division Duplexing (TDD) uplink/downlink (UL/DL) configuration, transmission mode, cell load, traffic type, etc. As a result, the configured HARQ feedback mode, and thus the cellular communications network, cannot achieve the best performance. For example, at call set-up, the HARQ feedback mode for a wireless device (e.g., a UE) is initially configured as HARQ Acknowledgement (ACK) multiplexing with Transmission Mode (TM) 3 (TM3). Later, when the transmission mode for the downlink to the wireless device is switched from TM3 to TM8, the throughput of the wireless device may be reduced due to different channel conditions for each codeword if HARQ-ACK multiplexing mode is still used. In another example, initially, when the cell is lightly loaded, wireless devices are configured with the Physical Uplink Control Channel (PUCCH) Format 3 HARQ feedback mode using PUCCH Format 3. Later, when more and more wireless devices are added, there may be insufficient PUCCH resources to admit new wireless devices.

Embodiments of the present disclosure relate to optimized selection, or determination of, the HARQ feedback modes for downlink transmissions by considering TDD uplink/downlink (uplink/downlink) configuration, transmission mode, cell load, and/or traffic type. In this manner, performance can be improved.

In some embodiments, when the cell is lightly loaded (e.g., when there are few PUCCH Format 3 resource collisions), the PUCCH Format 3 feedback mode is selected as the HARQ feedback mode for new wireless devices (i.e., wireless devices admitted to the cell) and, as such, the new wireless devices are configured with the PUCCH Format 3 HARQ feedback mode. When the probability of PUCCH Format 3 resource collision is greater than a predefined or preconfigured collision threshold (i.e., when the cell is highly loaded), either the HARQ-ACK bundling feedback mode or the HARQ-ACK multiplexing feedback mode is selected as the HARQ feedback mode for the new wireless devices and, as such, the new wireless devices are configured with either the HARQ-ACK bundling feedback mode or the HARQ-ACK multiplexing feedback mode. In some other embodiments, if a wireless device(s) is configured in one of the transmission modes which have two different Channel Quality Indication (CQI) reports for two codewords, such as TM4, TM8, TM9, and TM10, the HARQ-ACK bundling feedback mode is selected as the HARQ feedback mode for the wireless device(s) and, as such, the wireless device(s) are configured with the HARQ-ACK bundling feedback mode. In some other embodiments, if a wireless device(s) is configured to receive only one codeword, e.g., TM7, the HARQ-ACK multiplexing feedback mode is selected as the HARQ feedback mode for the wireless device(s) and, as such, the wireless device(s) are configured with the HARQ-ACK multiplexing feedback mode. In some other embodiments, if a wireless device(s) is configured in transmission modes which have only one CQI report and is supposed to receive two codewords, e.g., TM3, the HARQ feedback mode for the wireless device(s) will be based on one or more of the rules described below for selecting between the HARQ-ACK bundling feedback mode and the HARQ-ACK multiplexing feedback mode. In some other embodiments, when the transmission mode is switched from one mode to another one, the HARQ feedback mode may also be switched accordingly to, e.g., achieve the best performance. In some other embodiments, the transmission mode of a wireless device(s) is determined based on a traffic pattern and/or service type of the wireless device(s).

By properly selecting the HARQ feedback mode based on TDD UL/DL configuration, transmission mode, cell load, and/or traffic type, both the wireless device and cell throughputs can be greatly improved.

Figure 5:
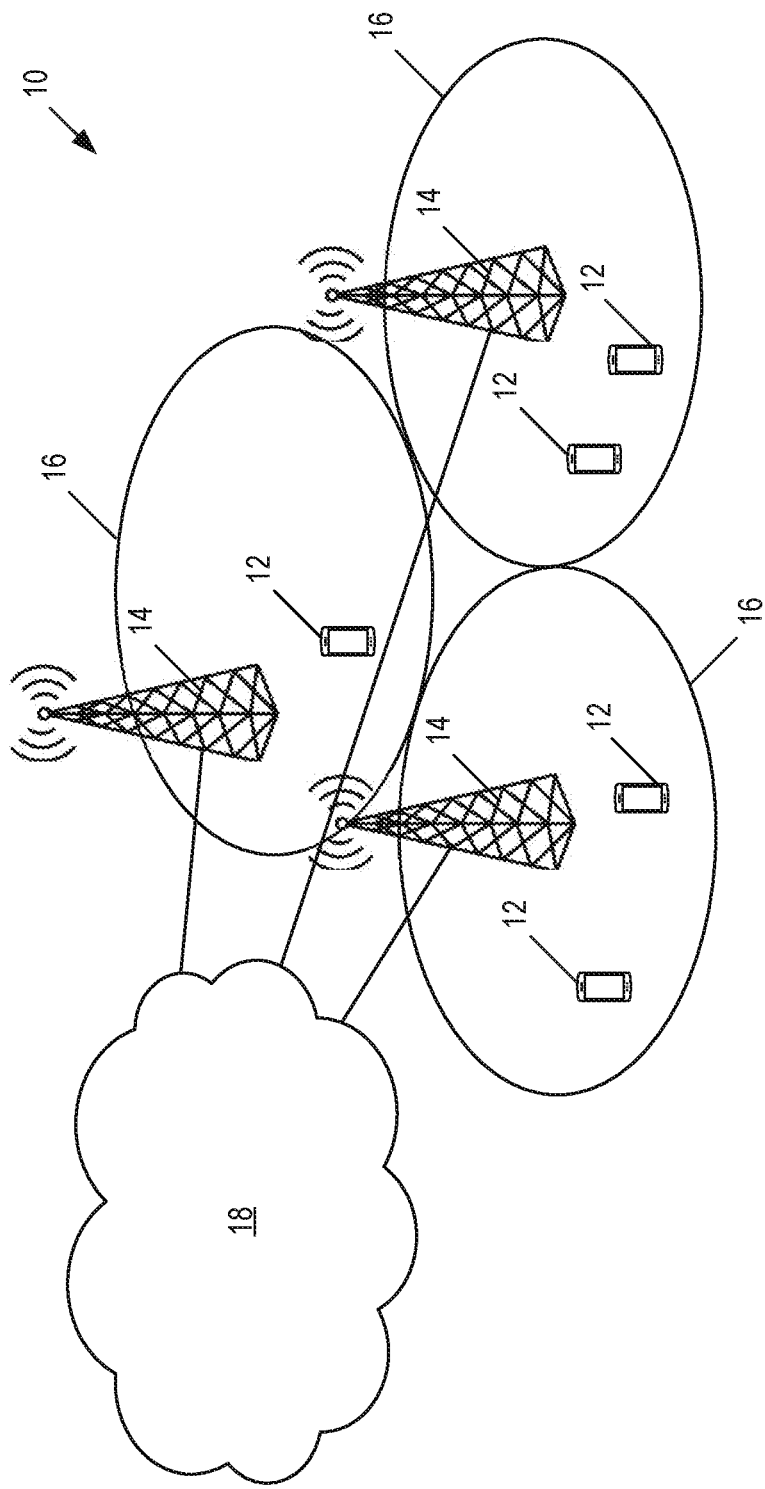
FIG. 5 illustrates one example of a cellular communications network in which embodiments of the present disclosure may be implemented.

Embodiments of the present disclosure may be implemented in any type of wireless communications system and, in particular, in any type of cellular communications network. In this regard, FIG. 5 illustrates one example of a cellular communications network 10 in which embodiments of the present disclosure may be implemented. In some preferred embodiments, the cellular communications network 10 is a 3GPP network and, as such, 3GPP terminology is sometimes used herein. However, the present disclosure is not limited thereto. As illustrated, the cellular communications network 10 provides wireless access and services to a number of wireless devices 12 (e.g., UEs). The cellular communications network 10 includes a number of radio access nodes 14 (e.g., base stations, eNBs, or gNBs, where "gNB" is a term that refers to base stations in a 5G New Radio (NR) network) serving corresponding cells 16. The radio access nodes 14 are connected to a core network 18. While not illustrated, the cellular communications network 10 may be a homogeneous network or a heterogeneous network that includes both high power nodes (e.g., eNBs) and low power nodes (e.g., micro base stations, pico base stations, home base stations (e.g., Home eNBs), or the like).

Figure 6:
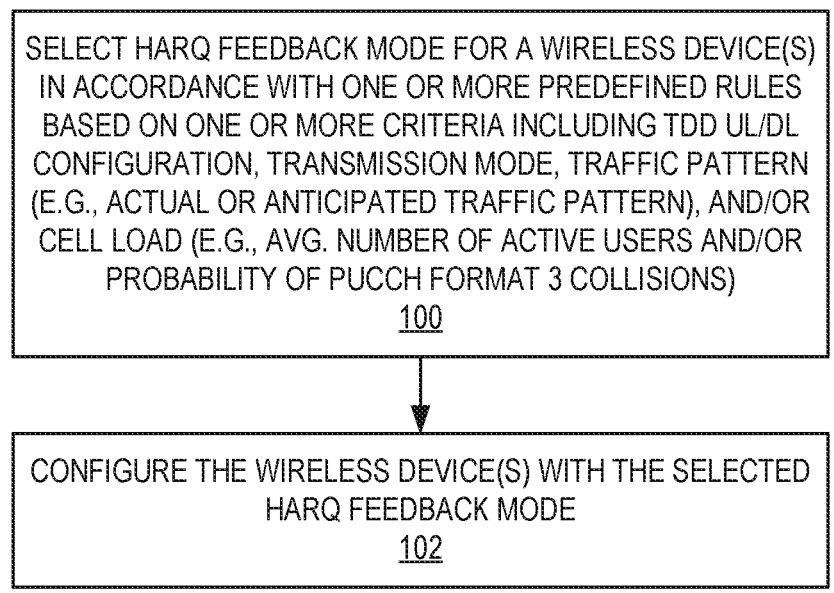
FIG. 6 is a flow chart that illustrates the operation of a network node according to some embodiments of the present disclosure.

FIG. 6 is a flow chart that illustrates the operation of a network node (e.g., a radio access node) to select a HARQ feedback mode for a wireless device(s) 12 and configure the wireless device(s) 12 with the selected HARQ feedback mode according to some embodiments of the present disclosure. As illustrated, the network node selects a HARQ feedback mode for a wireless device(s) 12 in accordance with one or more predefined rules based on one or more criteria including TDD UL/DL configuration for the cell 16, a downlink transmission mode for the wireless device(s) 12 in the cell 16, a traffic pattern for the wireless device(s) 12 in the cell 16, and/or a cell load of the cell 16 (step 100). In other words, the network node selects the HARQ feedback mode for the wireless device(s) 12 served by the cell 16 in accordance with any one of the aforementioned criteria or any combination of two or more of the aforementioned criteria. Indeed, in some embodiments, the network node has the capability to consider any and all of the aforementioned criteria but may consider any one or more of the criteria. In other embodiments, the network node has the capability to consider only some of the aforementioned criteria (e.g., may only have the capability to consider the one or more of the criteria on which the selection of the HARQ feedback mode is based).

In this embodiment, the wireless device(s) 12 for which the HARQ feedback mode is selected in step 100 is a new wireless device(s) 12 (i.e., a newly admitted wireless device(s) 12 to the cell 16). However, the present disclosure is not limited thereto. The HARQ feedback mode is selected from a predefined set of possible HARQ feedback modes. In the preferred embodiments described herein, the set of possible HARQ feedback modes includes the HARQ-ACK bundling feedback mode, the HARQ-ACK multiplexing feedback mode, and the PUCCH Format 3 feedback mode. The details of the selection process are described below. The network node then configures the wireless device(s) 12 with the selected HARQ feedback mode (step 102). The configuration of the wireless device(s) 12 with the selected HARQ feedback mode may be performed using any suitable signaling mechanism such as, for example, Radio Resource Control (RRC) CONNECTION SETUP or RRC CONNECTION RECONFIGURATION messages. MAC control element signaling can also be used to change the HARQ-ACK mode, which can be more dynamic and faster.

In some embodiments, the one or more rules used for HARQ feedback selection include one or more rules for selecting between the HARQ-ACK bundling feedback mode and the HARQ-ACK multiplexing feedback mode. Note that, in case of contradicting outcome of different rules (e.g., the outcome of one rule is HARQ-ACK multiplexing, while the outcome of another rule is HARQ-ACK bundling), the contradiction can be resolved by prioritizing the rules with any specific priority order and/or through majority vote decision.

In some embodiments, the one or more rules for selecting between the HARQ-ACK bundling feedback mode and the HARQ-ACK multiplexing feedback mode include one or more of the following rules:

Rule: If the wireless device(s) 12 is configured in one of a number of transmission modes which have two different CQI reports for two codewords, such as TM4, TM8, TM9, and TM10, the HARQ-ACK bundling feedback mode is to be selected if the average number of downlink active users (i.e., the average number of downlink wireless devices) is greater than or equal to a predefined or preconfigured active user threshold (ActiveUserThr2) and, otherwise, the HARQ-ACK multiplexing feedback mode is selected for the wireless device(s) 12. The wireless device(s) 12 will be configured with the selected HARQ feedback mode. The number of downlink active users can be averaged over a period of time before comparing with the threshold.

Rule: If the wireless device(s) 12 is configured to receive only one codeword, e.g., TM7, the HARQ-ACK multiplexing feedback mode is to be selected, since it will give better performance.

Rule: If the wireless device(s) 12 is configured in one of a number of transmission modes which have only one CQI report and is supposed to receive two codewords, e.g., TM3, the selection of HARQ feedback mode will be based on one or more of the following rules:

Rule: For TDD UL/DL configurations having the maximum HARQ-ACK window size less than a configurable parameter, n (e.g., when n=3 and TDD UL/DL configuration 1, the maximum window size is 2<n), the HARQ-ACK bundling feedback mode is to be selected.

Rule: If the traffic patterns of the wireless device(s) 12 do not require bundled downlink transmissions (e.g., the wireless device(s) 12 are Voice over LTE (VoLTE) users), the HARQ-ACK bundling feedback mode is to be selected. Note that VoLTE users often transmit Voice over Internet Protocol (VoIP) packets, which are typically scheduled every 40 or 60 milliseconds (ms) with smaller transport block sizes.

Rule: The traffic pattern of a wireless device 12 can be learned over time. For example, the traffic pattern for a wireless device 12 can be leaned over time by estimating, over a period of time, the percentage of all downlink transmissions to the wireless device 12 that are bundled downlink transmissions. This percentage is referred to herein as a "percentage of bundled downlink transmissions." If the percentage of bundled downlink transmissions is below a predefined or preconfigured threshold, lowBundledDlTxTh, the HARQ-ACK bundling feedback mode is to be selected. Similarly, if the percentage of bundled downlink transmissions is above a predefined or preconfigured threshold, highBundledDlTxTh, the HARQ-ACK multiplexing feedback mode is to be selected.

Rule: For TDD UL/DL configurations having the maximum HARQ-ACK window size greater than a configurable parameter, n (e.g., when n=3 and TDD UL/DL configuration 2), the selection between the HARQ-ACK bundling feedback mode and the HARQ-ACK multiplexing feedback mode will depend on the cell load. For example, if the average number of downlink active users is greater than a predefined or preconfigured threshold, ActiveUserThr1, the HARQ-ACK bundling feedback mode is to be selected; otherwise, the HARQ-ACK multiplexing feedback mode is to be selected. The number of downlink active users can be averaged over a period of time before comparing with the threshold.

In some embodiments, the one or more rules used for HARQ feedback selection include one or more rules for selecting the PUCCH Format 3 HARQ feedback mode versus the HARQ-ACK bundling or HARQ-ACK multiplexing feedback modes. Based on the current versions of the 3GPP standards, PUCCH Format 3 for HARQ-ACK/NACK feedback can be configured only for Release-10+ UEs that are Carrier Aggregation (CA) capable. In some embodiments, the network node ensures that CA configured UEs that require PUCCH Format 3 resources, such as 3-Component Carrier (3CC), 4CC, or 5CC configured UEs, will be given higher priority over non-CA UEs for the allocation of PUCCH Format 3 resources.

The selection of the PUCCH Format 3 HARQ feedback mode for TDD non-CA UEs should be limited based on the probability of having at least two UEs that cannot be scheduled in the same Transmit Time Interval (TTI) due to PUCCH Format 3 resource collisions. The probability of PUCCH Format 3 resource collision can be determined by taking the ratio of the number of PUCCH Format 3 collisions to the number of scheduled activities in the cell. For example, if the eNB performed 100 downlink scheduling and 10 of them were not successful due to PUCCH Format 3 collisions, the ratio would be 10%. If the probability of PUCCH Format 3 resource collision is greater than a predefined or preconfigured threshold, CollisionThr, either the HARQ-ACK bundling feedback mode or the HARQ-ACK multiplexing feedback mode is to be selected for the wireless device(s) 12 as described above. Conversely, if the probability of PUCCH Format 3 resource collision is less than a predefined or preconfigured threshold (e.g., CollisionThr), the PUCCH Format 3 HARQ feedback mode is to be selected for the wireless device(s) 12.

Figure 7:
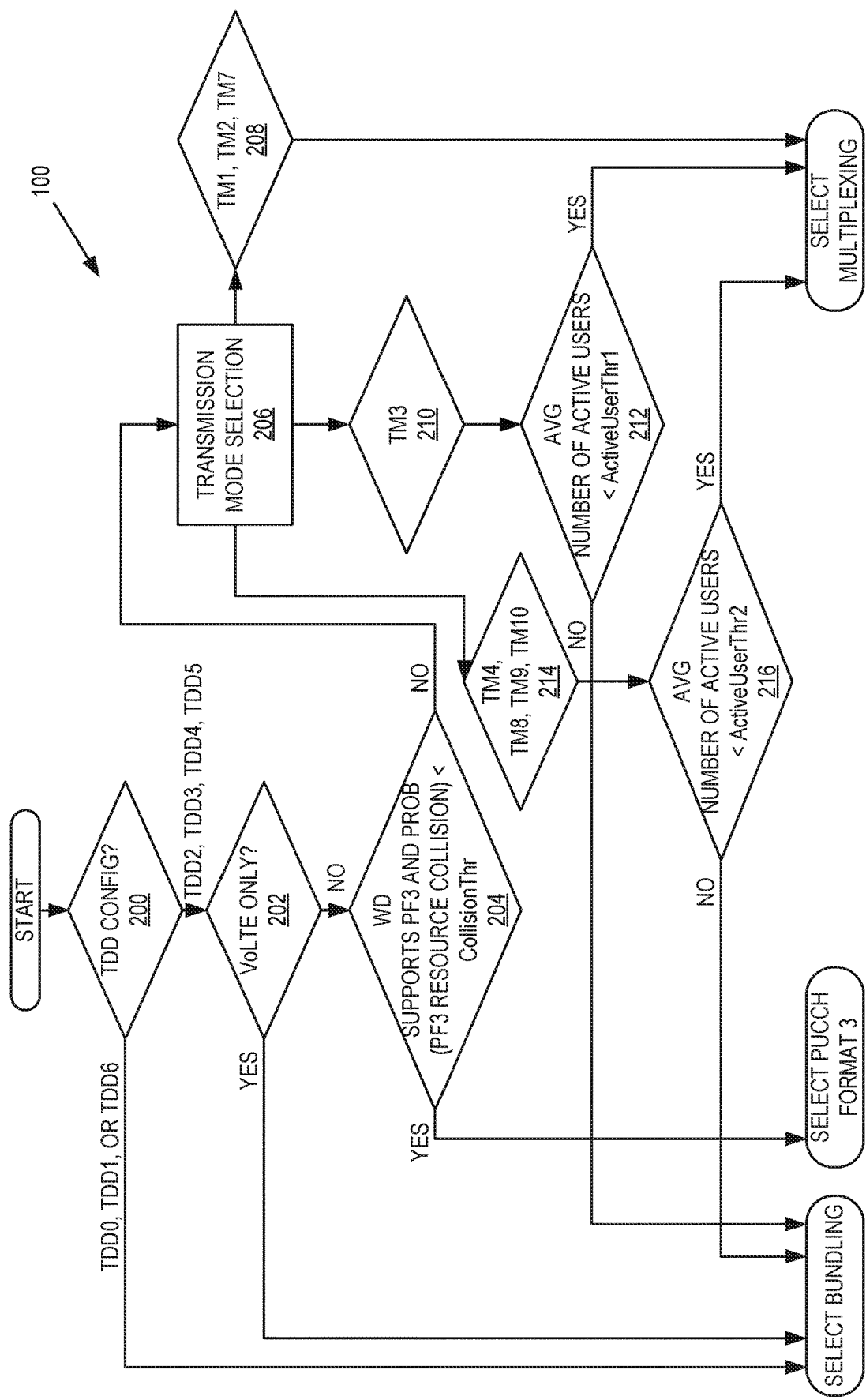
FIG. 7 is a flow chart that illustrates the selecting step of FIG. 6 in more detail according to some embodiments of the present disclosure.

FIG. 7 is a flow chart that illustrates step 100 of FIG. 6 in more detail according to one example embodiment of the present disclosure. Note that numerous variations of the process illustrated in FIG. 7 will be apparent to one of skill in the art upon reading this disclosure. As illustrated, when a HARQ feedback mode is to be selected for a wireless device 12 (e.g., when the wireless device 12 is admitted to the cell 16), the network node (e.g., the radio access node 14) determines the TDD UL/DL configuration for the cell 16 (step 200). If the TDD UL/DL configuration is either TDD UL/DL configuration 0, 1, or 6 as defined in the current 3GPP specifications, the network node selects the HARQ-ACK bundling feedback mode. Otherwise, if the TDD UL/DL configuration is TDD UL/DL configuration 2, 3, 4, or 5 as defined in the current 3GPP specifications, the network node determines whether the wireless device 12 is a VoLTE only wireless device (step 202). If so, the network node selects the HARQ-ACK bundling feedback mode. Otherwise, the network node determines whether the wireless device 12 supports PUCCH Format 3 and if the probability of PUCCH Format 3 resource collision is less than a predefined or preconfigured threshold, CollisionThr (step 204). If so, the network node selects the PUCCH Format 3 HARQ feedback mode. Otherwise, the network node selects or otherwise obtains the downlink transmission mode for the wireless device 12 (step 206). If the network node determines that the downlink transmission mode is TM1, TM2, or TM7 as defined in the current 3GPP specifications (step 208), the network node selects the HARQ-ACK multiplexing feedback mode. Note that, in one example alternative, the network node checks for TM1, TM2, or TM7 prior to checking whether the wireless device supports PUCCH Format 3 (i.e., before step 204). If the network node determines that the downlink transmission mode is TM3 as defined in the current 3GPP specifications (step 210), the network node determines whether the average number of active downlink users in the cell 16 is less than a predefined or preconfigured threshold, ActiveUserThr1 (step 212). If so, the network node selects the HARQ-ACK multiplexing feedback mode. If not, the network node selects the HARQ-ACK bundling feedback mode. Returning to step 206, if the network node determines that the downlink transmission mode is TM4, TM8, TM9, or TM10 as defined in the current 3GPP specifications (step 214), the network node determines whether the average number of active downlink users in the cell 16 is less than a predefined or preconfigured threshold, ActiveUserThr2 (step 216). If so, the network node selects the HARQ-ACK multiplexing feedback mode. If not, the network node selects the HARQ-ACK bundling feedback mode.

In some embodiments, the HARQ feedback mode configured for a wireless device 12 is selected when the wireless device 12 is first admitted to or connected to the cell 16. However, in some other embodiments, the HARQ feedback mode configured for a wireless device 12 is dynamically selected based on one or more criteria including a change in downlink transmission mode, a change in the traffic pattern of the wireless device 12, and/or a change in the cell load of the cell 16. In other words, selection of the HARQ feedback mode for the wireless device 12 may be dynamically triggered in response to a change in the downlink transmission mode for the wireless device 12, a change in the traffic pattern of the wireless device 12, UL/DL configuration, and/or a change in the cell load.

In some embodiments, when the transmission mode of a wireless device 12 is switched from one mode to another one, the HARQ feedback mode of the wireless device 12 may also be switched accordingly, e.g., to achieve the best performance. For example, at the call set-up, a wireless device 12 is configured to use TM3 with the HARQ-ACK multiplexing feedback mode. Later, when the channel condition for the wireless channel between the wireless device 12 and the radio access node 14 becomes worse, the transmission mode for the wireless device 12 will be switched from TM3 to, e.g., TM8 to get better wireless device throughput and coverage. Based on the rules above, the HARQ feedback mode is also switched from the HARQ-ACK multiplexing feedback mode to the HARQ-ACK bundling feedback mode. Similarly, when the channel condition improves, the transmission mode is switched back to TM3, and the HARQ feedback mode is switched from the HARQ-ACK bundling feedback mode to the HARQ-ACK multiplexing feedback mode to achieve better performance.

HARQ feedback mode switching can also happen depending on the traffic pattern of the wireless device 12 which depends on, e.g., the application used by the wireless device 12. For instance, if the wireless device 12 starts an application that requires heavy downlink transmission which results in a high number of bundled downlink transmissions, then the wireless device 12 is configured with the HARQ-ACK multiplexing feedback mode or the PUCCH Format 3 feedback mode, if possible. Once the wireless device 12 switches to an application that requires a low number of bundled downlink transmissions, e.g., VoLTE, then the HARQ feedback mode of the wireless device 12 is switched to the HARQ-ACK bundling feedback mode.

HARQ-ACK mode switching can also happen depending on the number of active users in a cell, or more generally depending on the cell load. When there is large number of active users in the cell 16 (or more generally when there is a high cell load), then the number of bundled downlink transmissions will be low and thus the network node may (re)configure one or more wireless devices 12 (existing and newly admitted wireless devices 12) with the HARQ-ACK bundling feedback mode. Similarly, when there is small number of active users in the cell 16 (or more generally when there is a low cell load), the number of bundled downlink transmissions will be high and thus the network node may (re)configure one or more wireless devices 12 (existing and newly admitted wireless devices 12) with the HARQ-ACK multiplexing feedback mode or the PUCCH Format 3 feedback mode, if possible.

In another embodiment, a wireless device(s) 12 (existing or newly admitted ones) may inform the network node about the preferred HARQ feedback mode of the wireless device(s) 12. For example, if a wireless device 12 does short message transmission (e.g., communicate with a social network) or gaming, it will send a message to inform the network node that its preferred HARQ feedback mode is the HARQ-ACK bundling feedback mode. If a wireless device 12 does a large file transfer, it may send a message to inform the network node that its preferred HARQ feedback mode is either PUCCH Format 3 or the HARQ-ACK multiplexing feedback mode. The network node will make the final decision for its HARQ feedback mode based on certain rules and conditions.

Figure 8:
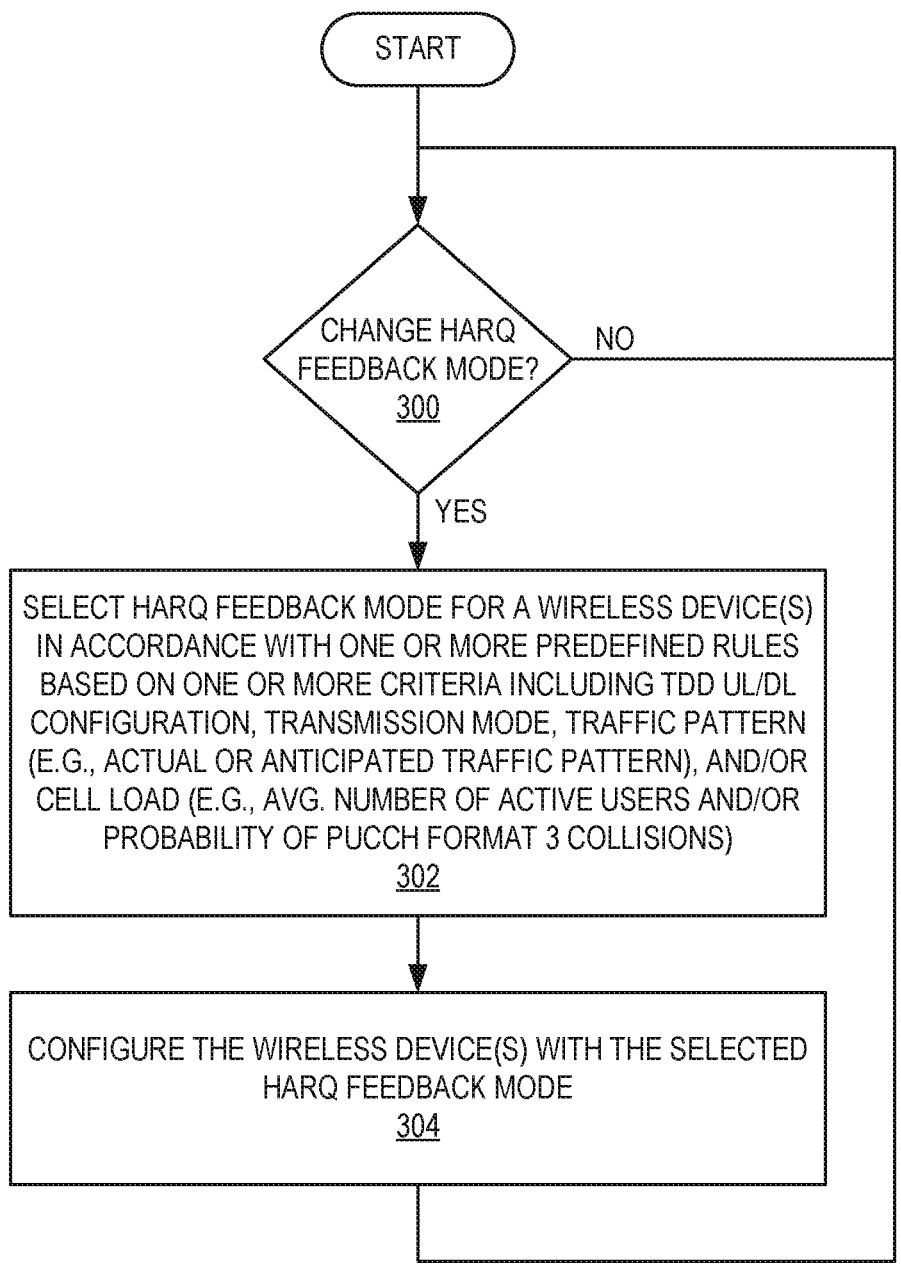
FIG. 8 is a flow chart that illustrates the operation of a network node according to some other embodiments of the present disclosure.

FIG. 8 is a flow chart that illustrates one example of a method of operation of a network node to dynamically select and configure the HARQ feedback mode of a wireless device(s) 12 according to some embodiments of the present disclosure. As illustrated, the network node determines whether a change in the HARQ feedback mode of the wireless device(s) 12 may be needed (step 300). The decision of step 300 is based on one or more criteria including a change in the downlink transmission mode for the wireless device 12, a change in the traffic pattern of the wireless device 12, and/or a change in the cell load. In other words, the network node determines whether a trigger for selecting a new HARQ feedback mode for the wireless device(s) 12 has been detected, where the trigger may be a change in the downlink transmission mode for the wireless device 12, a change in the traffic pattern of the wireless device 12, and/or a change in the cell load. If the network node determines that no change in the HARQ feedback mode is needed (e.g., if no trigger is detected), the process returns to step 300 such that the network node continues to monitor for a trigger for selecting a new HARQ feedback mode for the wireless device(s) 12.

Upon determining that the HARQ feedback mode selection of the wireless device(s) 12 may be needed, the network node selects a (new) HARQ feedback mode for the wireless device(s) 12 in accordance with one or more predefined rules based on one or more criteria including TDD UL/DL configuration for the cell 16, a downlink transmission mode for the wireless device(s) 12 in the cell 16, a traffic pattern for the wireless device(s) 12 in the cell 16, and/or a cell load of the cell 16, as described above (step 302). The details of step 302 are the same as that described above with respect to step 100 of FIG. 6. The network node configures the wireless device(s) 12 with the selected HARQ feedback mode, as described above (step 304).

Figure 9:
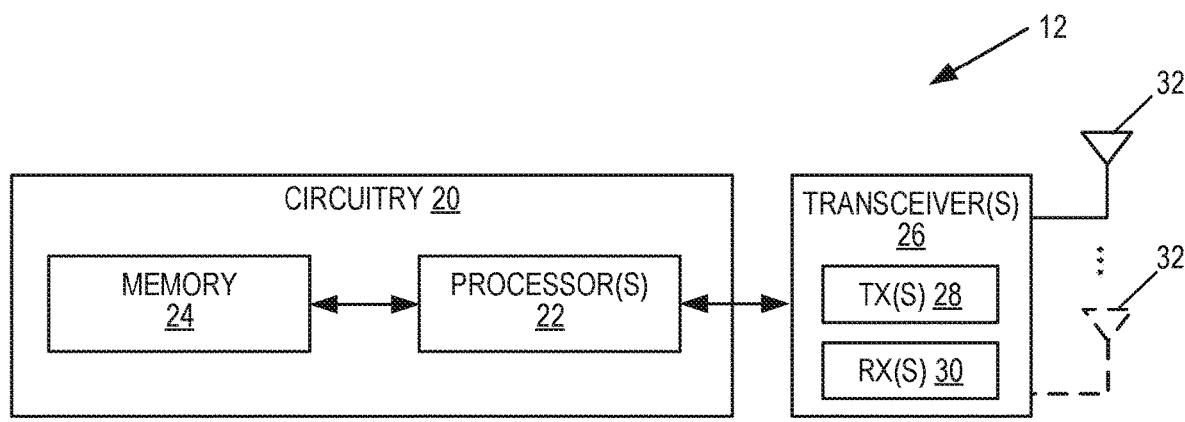
FIGS. 9 and 10 illustrate example embodiments of a wireless device.

FIG. 9 is a schematic block diagram of the wireless device 12 (e.g., UE) according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described above may be fully or partially implemented in software that is, e.g., stored in the memory 24 and executed by the processor(s) 22.

In some embodiments, a computer program including instructions which, when executed by the at least one processor 22, causes the at least one processor 22 to carry out the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
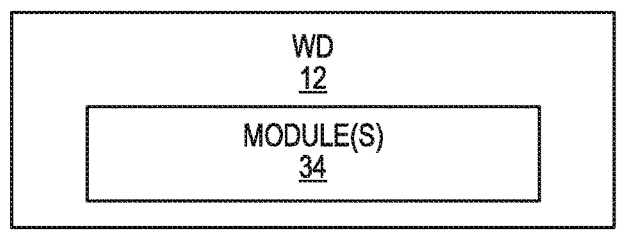

FIG. 10 is a schematic block diagram of the wireless device 12 (e.g., UE) according to some other embodiments of the present disclosure. The wireless device 12 includes one or more modules 34, each of which is implemented in software. The module(s) 34 provide the functionality of the wireless device 12 described herein.

Figure 11:
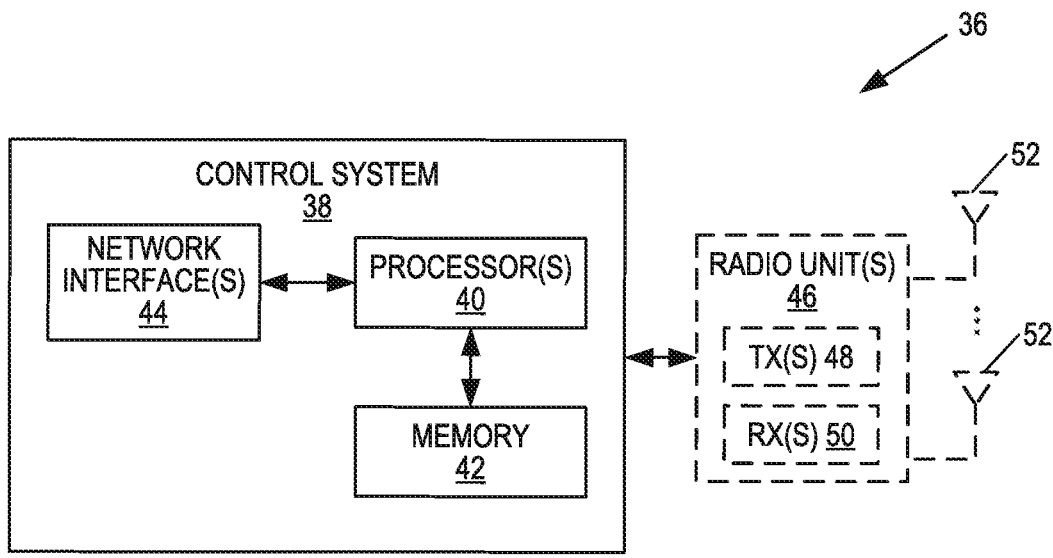
FIGS. 11 through 13 illustrate example embodiments of a network node.

FIG. 11 is a schematic block diagram of a network node 36 (e.g., a radio access node 14 such as, for example, an eNB or gNB) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each includes one or more transmitters 48 and one or more receivers 50 coupled to one or more antennas 52. In some embodiments, the functionality of the network node 36 (e.g., the functionality of the radio access node 14) described above may be fully or partially implemented in software that is, e.g., stored in the memory 42 and executed by the processor(s) 40.

Figure 12:
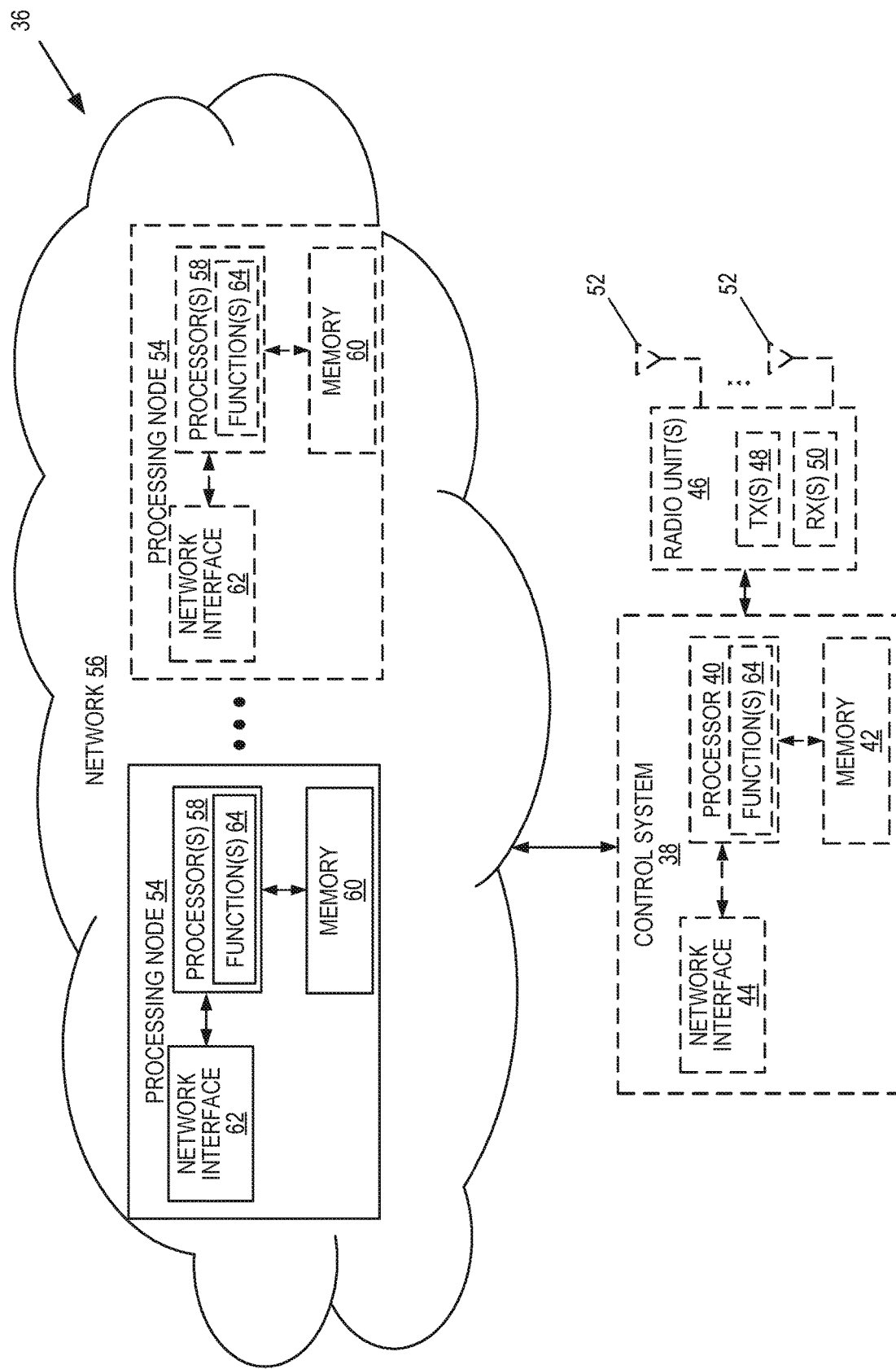

FIG. 12 is a schematic block diagram that illustrates a virtualized embodiment of the network node 36 (e.g., the radio access node 14) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 11. In addition, if the network node 36 is the radio access node 14, the network node 36 also includes the one or more radio units 46, as described with respect to FIG. 11. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54 (i.e., the network node 36 does not include the control system 38 or the radio unit(s) 46). Each processing node 54 includes one or more processors 58 (e.g., CPUs, ASICs, DSPs, FPGAs, and/or the like), memory 60, and a network interface 62.

In this example, functions 64 of the network node 36 described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 60).

Figure 13:
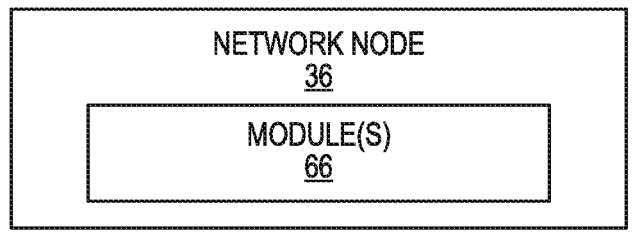

FIG. 13 is a schematic block diagram of the network node 36 (e.g., the radio access node 14) according to some other embodiments of the present disclosure. The network node 36 includes one or more modules 66, each of which is implemented in software. The module(s) 66 provide the functionality of the network node 36 described herein. The module (s) 66 may comprise, for example, a selecting module operable to perform step 100 of FIG. 6 or step 302 of FIG. 8 and a configuring module operable to perform step 102 of FIG. 6 or step 304 of FIG. 8. Optionally, the module(s) 66 may include a determining module operable to perform step 300 of FIG. 8.

EXAMPLE EMBODIMENTS

While not being limited thereto, some example embodiments of the present disclosure are provided below.

1. A method of operation of a network node (14) in a cellular communications network (10), comprising:
  selecting (100, 302) a HARQ feedback mode for at least one wireless communication device (12) served by a cell (16) in accordance with one or more predefined rules based on one or more criteria comprising a TDD UL/DL configuration for the cell (16), a downlink transmission mode for the at least one wireless communication device (12) for the cell (16), a traffic pattern for the at least one wireless communication device (12) for the cell (16), and/or a cell load of the cell (16); and
  configuring (102, 304) the at least one wireless communication device (12) with the HARQ feedback mode.

2. The method of embodiment 1 wherein the one or more predefined rules comprise at least one rule based on the TDD UL/DL configuration for the cell (16).

3. The method of any one of embodiments 1 to 2 wherein the one or more predefined rules comprise at least one rule based on the downlink transmission mode for the at least one wireless communication device (12) for the cell (16).

4. The method of any one of embodiments 1 to 3 wherein the one or more predefined rules comprise at least one rule based on the traffic pattern for the at least one wireless communication device (12) for the cell (16).

5. The method of any one of embodiments 1 to 4 wherein the one or more predefined rules comprise at least one rule based on the cell load of the cell (16).

6. The method of any one of embodiments 1 to 5 wherein the one or more predefined rules are prioritized.

7. The method of any one of embodiments 1 to 6 wherein the one or more predefined rules comprise at least one rule based on the wireless device preferred HARQ feedback mode.

8. The method of any one of embodiments 1 to 7 wherein selecting (100, 302) the HARQ feedback mode comprises selecting (100, 302) the HARQ feedback mode from a plurality of predefined HARQ feedback modes comprising a HARQ-ACK bundling feedback mode, a HARQ-ACK multiplexing feedback mode, and a feedback mode that provides individual HARQ feedback for each codeword and for each subframe.

9. The method of embodiment 8 wherein the feedback mode that provides individual HARQ feedback for each codeword and for each subframe is a HARQ feedback mode that uses PUCCH Format 3.

10. The method of embodiment 8 or 9 wherein the one or more predefined rules comprise a rule that states that the feedback mode that provides individual HARQ feedback for each codeword and for each subframe is to be selected if the PUCCH Format 3 collision rate is less than a predefined threshold.

11. The method of any one of embodiments 8 to 10 wherein the one or more predefined rules comprise a rule that states that either the HARQ-ACK bundling feedback mode or the HARQ-ACK multiplexing feedback mode is to be selected if the cell load is greater than a predefined threshold.

12. The method of any one of embodiments 8 to 11 wherein the one or more predefined rules comprise a rule that states that, if the at least one wireless communication device (12) is configured in one of a set of transmission modes that have two different CQI reports for two codewords, the HARQ-ACK bundling feedback mode is to be selected.

13. The method of any one of embodiments 8 to 12 wherein the one or more predefined rules comprise a rule that states that, if the at least one wireless communication device (12) is configured in a transmission mode in which the at least one wireless communication device (12) is to receive only one codeword, the HARQ-ACK multiplexing feedback mode is to be selected.

14. The method of any one of embodiments 8 to 13 wherein the one or more predefined rules comprise a rule that states that, if the at least one wireless communication device (12) is configured in a transmission mode that has only one CQI report and in which the at least one wireless communication device (12) is to receive two codewords, the HARQ feedback mode is to be based on one or more rules for selecting between the HARQ-ACK bundling feedback mode and the HARQ-ACK multiplexing feedback mode.

15. The method of embodiment 14 wherein the one or more rules for selecting between the HARQ-ACK bundling feedback mode and the HARQ-ACK multiplexing feedback mode comprise at least one of the following rules: a rule that states that the HARQ-ACK bundling feedback mode is to be selected if the TDD UL/DL configuration is one having a maximum HARQ-ACK window size that is less than a configurable parameter, n;

a rule that states that, if the traffic pattern for the at least one wireless communication device (12) does not require bundled downlink transmissions, then HARQ-ACK bundling is to be selected;

a rule that states that the HARQ-ACK bundling feedback mode is to be selected if a percentage of all downlink transmissions to the at least one wireless communication device (12) in the cell (16) that are bundled downlink transmissions is less than a predefined threshold;

a rule that states that the HARQ-ACK multiplexing feedback mode is to be selected if the percentage of all downlink transmissions to the at least one wireless communication device (12) in the cell (16) that are bundled downlink transmissions is greater than a predefined threshold;

a rule that states that, if the TDD UL/DL configuration is one having a maximum HARQ-ACK window size that is greater than a configurable parameter, n, the HARQ-ACK bundling feedback mode is to be selected if an average number of downlink active users is greater than a predefined threshold and, otherwise, the HARQ-ACK multiplexing feedback mode is to be selected.

16. The method of any one of embodiments 8 to 15 wherein the one or more predefined rules comprise a rule that states that, if the at least one wireless communication device (12) is configured in a transmission mode that has two different CQI reports for two codewords, the HARQ-ACK bundling feedback mode is to be selected if an average number of downlink active users is greater than or equal to a predefined threshold number of active users and, otherwise, the HARQ-ACK multiplexing feedback mode is to be selected.

17. The method of any one of embodiments 8 to 16 wherein:

the feedback mode that provides individual HARQ feedback for each codeword and for each subframe is a HARQ feedback mode that uses PUCCH Format 3; and the one or more predefined rules comprise a rule that states that, if the at least one wireless communication device (12) is at least one TDD non-CA wireless communication device (12), the feedback mode that provides individual HARQ feedback for each codeword and for each subframe is to be selected if a probability of PUCCH Format 3 collision is less than a predefined collision threshold and, otherwise, either the HARQ-ACK bundling feedback mode or the HARQ-ACK multiplexing feedback mode is to be selected.

18. The method of any one of embodiments 1 to 17, wherein selecting (302) the HARQ feedback mode comprises selecting (302) a first HARQ feedback mode for the at least one wireless communication device (12); and configuring (304) the at least one wireless communication device (12) comprises configuring (304) the at least one wireless communication device (12) with the first HARQ feedback mode; and the method further comprises:
 determining (300) that there is to be a change in HARQ feedback mode for the at least one wireless communication device (12); and
 upon determining (300) that there is to be a change in HARQ feedback mode for the at least one wireless communication device (12):
  selecting (302) a second HARQ feedback mode for the at least one wireless communication device (12) in accordance with the one or more predefined rules based on the one or more criteria comprising the TDD UL/DL configuration for the cell (16), the downlink transmission mode for the at least one wireless communication device (12) in the cell (16), the traffic pattern for the at least one wireless communication device (12) in the cell (16), and/or the cell load of the cell (16); and
  configuring (304) the at least one wireless communication device (12) with the second HARQ feedback mode.

19. The method of embodiment 18 wherein determining (300) that there is to be a change in HARQ feedback mode for the at least one wireless communication device (12) comprises determining (300) that there is to be a change in HARQ feedback mode for the at least one wireless communication device (12) based on at least one criterion comprising a change in the downlink transmission mode for the at least one wireless communication device (12) in the cell (16), a change in the traffic pattern for the at least one wireless communication device (12) in the cell (16), and a change in the cell load of the cell (16).

20. A network node (14) for a cellular communications network (10), the network node (14) adapted to perform the method of any one of embodiments 1 to 19.

21. A computer program comprising instructions which, when executed on at least one processor, cause the at least one processor to carry out the method according to any one of embodiments 1 to 19.

22. A carrier containing the computer program of embodiment 21, wherein the carrier is one of an electronic signal, an optical signal, a radio signal, or a computer readable storage medium.

23. A network node (14, 36) for a cellular communications network (10), comprising:
 at least one processor (40, 58); and
 memory (42, 60) storing instructions executable by the at least one processor (40, 58) whereby the network node (14, 36) is operable to perform the method of any one of embodiments 1 to 19.

24. A network node (14, 36) for a cellular communications network (10), comprising:
 a selecting module (66) operable to select a HARQ feedback mode for at least one wireless communication device (12) served by a cell (16) in accordance with one or more predefined rules based on one or more criteria comprising a TDD UL/DL configuration for the cell (16), a downlink transmission mode for the at least one wireless communication device (12) for the cell (16), a traffic pattern for the at least one wireless communication device (12) for the cell (16), and/or a cell load of the cell (16); and
 a configuring module (66) operable to configure the at least one wireless communication device (12) with the HARQ feedback mode.

The following acronyms are used throughout this disclosure.
 3GPP Third Generation Partnership Project
 5G Fifth Generation
 ACK Acknowledgement
 ASIC Application Specific Integrated Circuit
 CA Carrier Aggregation
 CC Component Carrier
 CDD Cyclic Delay Diversity
 CPU Central Processing Unit
 CQI Channel Quality Indication
 DL Downlink
 DSP Digital Signal Processor
 eNB Enhanced or Evolved Node B FDD Frequency Division Duplexing
FPGA Field Programmable Gate Array
HARQ Hybrid Automatic Repeat Request
LTE Long Term Evolution
MIMO Multiple Input Multiple Output
MME Mobility Management Entity
ms Millisecond
MTC Machine Type Communication
NACK Negative Acknowledgment
NR New Radio
PDSCH Physical Downlink Shared Channel
P-GW Packet Data Network Gateway
PUCCH Physical Uplink Control Channel
RRC Radio Resource Control
SCEF Service Capability Exposure Function
TDD Time Division Duplexing
TM Transmission Mode
TS Technical Specification
TTI Transmit Time Interval
UE User Equipment
UL Uplink
VOIP Voice Over Internet Protocol
VoLTE Voice Over Long Term Evolution Those skilled in the art will recognize improvements and modifications to the embodiments of the present disclosure. All such improvements and modifications are considered within the scope of the concepts disclosed herein.

What is claimed is:

1. A method of operation of a network node in a cellular communications network, comprising:
    selecting a Hybrid Automatic Repeat Request, HARQ, feedback mode from a plurality of predefined HARQ feedback modes comprising a HARQ Acknowledgement, ACK, bundling feedback mode, a HARQ-ACK multiplexing feedback mode, and a feedback mode that provides individual HARQ feedback for each codeword and for each subframe, for at least one wireless communication device served by a cell in accordance with a rule, out of one or more predefined rules, that states that, if the at least one wireless communication device is configured in a transmission mode in which the at least one wireless communication device is to receive only one codeword, the HARQ-ACK multiplexing feedback mode is selected; and
    configuring the at least one wireless communication device with the HARQ feedback mode.

2. The method of claim 1, wherein the one or more predefined rules comprise at least one rule based on the TDD UL/DL configuration for the cell.

3. The method of claim 1 wherein the one or more predefined rules comprise at least one rule based on the downlink transmission mode for the at least one wireless communication device for the cell.

4. The method of claim 1 wherein the one or more predefined rules comprise at least one rule based on the traffic pattern for the at least one wireless communication device for the cell.

5. The method of claim 1 wherein the one or more predefined rules comprise at least one rule based on the cell load of the cell.

6. The method of claim 1 wherein the one or more predefined rules are prioritized.

7. The method of claim 1 wherein the one or more predefined rules comprise at least one rule based on the wireless device preferred HARQ feedback mode.

8. The method of claim 1, wherein the feedback mode that provides individual HARQ feedback for each codeword and for each subframe is a HARQ feedback mode that uses Physical Uplink Control Channel, PUCCH, Format 3.

9. The method of claim 1, wherein the one or more predefined rules comprise a rule that states that the feedback mode that provides individual HARQ feedback for each codeword and for each subframe is to be selected if a collision rate is less than a predefined threshold.

10. The method of claim 1, wherein the one or more predefined rules comprise a rule that states that either the HARQ-ACK bundling feedback mode or the HARQ-ACK multiplexing feedback mode is to be selected if the cell load is greater than a predefined threshold.

11. The method of claim 1, wherein the one or more predefined rules comprise a rule that states that, if the at least one wireless communication device is configured in one of a set of transmission modes that have two different Channel Quality Indication, CQI, reports for two codewords, the HARQ-ACK bundling feedback mode is to be selected.

12. The method of claim 1, wherein the one or more predefined rules comprise a rule that states that, if the at least one wireless communication device is configured in a transmission mode that has only one CQI report and in which the at least one wireless communication device is to receive two codewords, the HARQ feedback mode is to be based on one or more rules for selecting between the HARQ-ACK bundling feedback mode and the HARQ-ACK multiplexing feedback mode.

13. The method of claim 12 wherein the one or more rules for selecting between the HARQ-ACK bundling feedback mode and the HARQ-ACK multiplexing feedback mode comprise at least one of the following rules:
    a rule that states that the HARQ-ACK bundling feedback mode is to be selected if the TDD UL/DL configuration is one having a maximum HARQ-ACK window size that is less than a configurable parameter, n;
    a rule that states that, if the traffic pattern for the at least one wireless communication device does not require bundled downlink transmissions, then HARQ-ACK bundling is to be selected;
    a rule that states that the HARQ-ACK bundling feedback mode is to be selected if a percentage of all downlink transmissions to the at least one wireless communication device in the cell that are bundled downlink transmissions is less than a predefined threshold;
    a rule that states that the HARQ-ACK multiplexing feedback mode is to be selected if the percentage of all downlink transmissions to the at least one wireless communication device in the cell that are bundled downlink transmissions is greater than a predefined threshold; and
    a rule that states that, if the TDD UL/DL configuration is one having a maximum HARQ-ACK window size that is greater than a configurable parameter, n, the HARQ-ACK bundling feedback mode is to be selected if an average number of downlink active users is greater than a predefined threshold and, otherwise, the HARQ-ACK multiplexing feedback mode is to be selected.

14. The method of claim 1, wherein the one or more predefined rules comprise a rule that states that, if the at least one wireless communication device is configured in a transmission mode that has two different CQI reports for two codewords, the HARQ-ACK bundling feedback mode is to be selected if an average number of downlink active users is greater than or equal to a predefined threshold number of active users and, otherwise, the HARQ-ACK multiplexing feedback mode is to be selected.

15. The method of claim 1, wherein:
the feedback mode that provides individual HARQ feedback for each codeword and for each subframe is a HARQ feedback mode that uses PUCCH Format 3; and
the one or more predefined rules comprise a rule that states that, if the at least one wireless communication device is at least one TDD non-Carrier Aggregation, CA, wireless communication device, the feedback mode that provides individual HARQ feedback for each codeword and for each subframe is to be selected if a probability of PUCCH Format 3 collision is less than a predefined collision threshold and, otherwise, either the HARQ-ACK bundling feedback mode or the HARQ-ACK multiplexing feedback mode is to be selected.

16. The method of claim 1,
wherein selecting the HARQ feedback mode comprises selecting a first HARQ feedback mode for the at least one wireless communication device; and
configuring the at least one wireless communication device comprises configuring the at least one wireless communication device with the first HARQ feedback mode; and
the method further comprises:
determining that there is to be a change in HARQ feedback mode for the at least one wireless communication device; and
upon determining that there is to be a change in HARQ feedback mode for the at least one wireless communication device:
selecting a second HARQ feedback mode for the at least one wireless communication device in accordance with the one or more predefined rules based on the one or more criteria comprising the TDD UL/DL configuration for the cell, the downlink transmission mode for the at least one wireless communication device in the cell, the traffic pattern for the at least one wireless communication device in the cell, and/or the cell load of the cell; and
configuring the at least one wireless communication device with the second HARQ feedback mode.

17. The method of claim 16 wherein determining that there is to be a change in HARQ feedback mode for the at least one wireless communication device comprises determining that there is to be a change in HARQ feedback mode for the at least one wireless communication device based on at least one criterion comprising a change in the downlink transmission mode for the at least one wireless communication device in the cell, a change in the traffic pattern for the at least one wireless communication device in the cell, and a change in the cell load of the cell.

18. A network node for a cellular communications network, the network node adapted to perform the method of claim 1.

19. A computer program product comprising a non-transitory computer readable medium storing instructions which, when executed on at least one processor, cause the at least one processor to carry out the method according to claim 1.

20. A network node for a cellular communications network, comprising:
at least one processor; and
memory storing instructions executable by the at least one processor whereby the network node is operable to perform operations comprising:
selecting a Hybrid Automatic Repeat Request, HARQ, feedback mode from a plurality of predefined HARQ feedback modes comprising a HARQ Acknowledgement, ACK, bundling feedback mode, a HARQ-ACK multiplexing feedback mode, and a feedback mode that provides individual HARQ feedback for each codeword and for each subframe, for at least one wireless communication device served by a cell in accordance with a rule that states that, if the at least one wireless communication device is configured in a transmission mode in which the at least one wireless communication device is to receive only one codeword, the HARQ-ACK multiplexing feedback mode is selected; and
configuring the at least one wireless communication device with the HARQ feedback mode.

* * * * *